(12) United States Patent
Miller

(10) Patent No.: US 6,532,198 B1
(45) Date of Patent: Mar. 11, 2003

(54) PROGRAMMABLE SELF-OPERATING COMPACT DISK DUPLICATION SYSTEM

(75) Inventor: David Miller, Orinda, CA (US)

(73) Assignee: Wordtech Systems, Inc., Concord, CA (US)

( * ) Notice: Subject to any disclaimer, the term of this patent is extended or adjusted under 35 U.S.C. 154(b) by 0 days.

(21) Appl. No.: 09/696,376

(22) Filed: Oct. 25, 2000

Related U.S. Application Data

(60) Division of application No. 09/152,815, filed on Sep. 14, 1998, now Pat. No. 6,141,298, which is a continuation-in-part of application No. 08/816,257, filed on Mar. 13, 1997, now abandoned.

(51) Int. Cl.$^7$ .............................................. G11B 17/22
(52) U.S. Cl. .......................................... 369/36; 369/178
(58) Field of Search .............................. 369/29, 30, 32, 369/33, 34, 36, 37, 38, 42, 75.2, 178, 197, 201, 202

(56) References Cited

U.S. PATENT DOCUMENTS

| | | | | |
|---|---|---|---|---|
| 5,291,465 A | * | 3/1994 | Dennis | 369/34 X |
| 5,532,986 A | * | 7/1996 | Sakiyama | 369/38 X |
| 5,703,453 A | * | 12/1997 | An | 369/38 X |
| 5,914,918 A | * | 6/1999 | Lee et al. | 369/34 |
| 5,946,216 A | * | 8/1999 | Hollerich | 369/34 X |

OTHER PUBLICATIONS

Cochrane, K., "Automated CD–R Recording, Duplication or Replication?" circa Jun. 6, 1996, p. 2 (MTC Trans/corder), San Jose, California, USA.

* cited by examiner

*Primary Examiner*—Paul W. Huber
(74) *Attorney, Agent, or Firm*—Richard Esty Peterson Patent Attorney

(57) ABSTRACT

A system for the duplication of binary data onto CD-R disks, the system including a copy unit, a host computer and computer software, the software being installed in the host computer to provide a user interface and to direct the transfer of data from the host computer to the copy unit, the copy unit including a set of multiple stacked recordable disk drives, a microprocessor electronically connected to the activating mechanism of a pivotal transport tower and to the set of multiple stacked recordable disk drives. A robotic disk pickup head on the pivotal transport tower is encompassed by a set of disk spindle members arranged in a symmetric semi-circular pattern around the central tower, the disk pickup head being connected to the pivotal transport tower with an elevator mechanism for lifting and transporting compact disks among the disk spindle members and any selected one of the stacked recordable disk drive members. The microprocessor concurrently directs the movement of the disk pickup head and the copying of data to the CD-R disks in the disk drive members. After a disk copy operation is completed, the computer software and microprocessor may direct the stacked recordable disk drive members to inspect the burned CD-R disks for copy errors and further direct the disk pickup head to remove and eject defective burned CD-R disks and place properly burned CD-R disks on a specified disk spindle member. The system allows for source data to be read from multiple master compact disks inserted in specified stacked recordable disk drive members to provide for random access copying from the multiple master compact disks.

20 Claims, 8 Drawing Sheets

PROGRAMMABLE SELF-OPERATING COMPACT DISK DUPLICATION SYSTEM

CROSS-REFERENCE TO RELATED APPLICATIONS

This application is a divisional of U.S. application Ser. No. 09/152,815, filed Sep. 14, 1998, now U.S. Pat. No. 6,141,198, issued Oct. 31, 2000, which is a continuation-in-part of application Ser. No. 08/816,257, filed Mar. 13, 1997, abandoned.

BACKGROUND OF THE INVENTION

Digital compact disks were originally conceived in the early 1980's as a technique to accurately copy and preserve audio recordings intended for sale to a mass market of consumers. As computing power has increased exponentially since that time, information processing tasks unthinkable only a few years ago have become commonplace and require large amounts of data most economically and conveniently stored on digital compact disks.

Until recently the transfer of data onto compact digital disks was a costly procedure economically feasible only when manufacturing a large quantity of copies. Users whose applications required relatively few copies or required frequent data updates could not reap the benefits of this technology, even though lowcost disk-readers were readily available.

The advent of recordable digital compact disks, generally referred to as "CD-R" disks, was intended to allow users to record their own disks and thereby achieve significant savings. Unlike a common compact disk that has been pressed by a mold, a CD-R has a dye layer that is etched by a laser contained in the CD-R disk drive. Once etched, the "burned" CD-R disk is unalterable and will retain data for approximately 75 years.

Several practical problems have prevented CD-R users from attaining maximal efficiency in the copy process, especially when attempting to make multiple disk copies in a short amount of time. The primary problem occurring in this situation is that the data throughput from the data source, such as a file on a hard disk drive or a master compact digital disk, to the write head of the CD-R drive is interrupted during the copy process. Many times when this occurs the data buffer to the write head of the CD-R drive is exhausted and null data is written onto the CD-R disk, making the CD-R disk irrevocably defective.

The frequency of such a defective CD-R disk write increases at least linearly as the drive speed of the CD-R writing head is increased. The industry standard speed is approximately 150K Bytes per second. Some CD-R disk drives can write data at four times this standard speed, but while this increased speed lowers the total copying time, the frequency of defective CD-R disk writes increases as data throughput from the data source is increased.

An additional problem in a volume copying process is the necessity for direct human supervision to prepare CD-R disks for copying, remove the disks from the CD-R disk writer once copying is complete, and then prepare the disks for inspection to ensure no defective CD-R disks are retained in the completed set of copies. Aside from the tedium involved that may indirectly add errors, requiring human attention in this process adds a significant labor cost that is added to the end-user price.

The copy speed versus accuracy problem described above is solved when the CD-R disk writer is configured to concurrently copy the data onto multiple CD-R disks. For example, the total copy time for two CD-R disk drives concurrently copying data at 150K Bytes per second is the same as one CD-R disk drive serially copying two CD-R disks at 300K Bytes per second, and the frequency of disk write errors using the concurrent disk drives is approximately half that of the serial disk drive.

This system uses the concurrent copying method described above and also eliminates the necessity of direct human supervision of the copy process through the unique circular arrangement of CD-R disk spindle members around a pivotal transport tower containing a disk pickup head that lifts a blank disk from a disk spindle member and transports the disk to one of the available stacked CD-R disk drives. After the recording process is complete the disk pickup head retrieves and transports the burned CD-R disk copy to a specified disk spindle member for copied disks.

The electrical and physical configuration of this system provides several additional benefits to users. The semi-circular arrangement of disk spindle members around the pivotal transport tower minimizes the number of moving parts needed to construct the disk transport assembly. A system having more disk spindle members can be constructed by increasing the radius of the circle formed by the disk spindle members. Similarly, the arrangement of two stacked sets of recordable disk drives allows for a scaleable design permitting the user to make low-cost upgrades.

Prior disk copy methods only provided for lineal copying of a single source disk. The configuration of this system allows for several master compact disks to be transportable by the disk hub to a selected disk read head so that the copy process from the master compact disks is a random access process.

Yet another benefit provided by this system is the system's ability to test burned CD-R disks for disk write errors, and through use of the pivotal transport tower, eject a defective CD-R disk isolating the defective CD-R disks from the set of properly burned CD-R disks.

SUMMARY OF THE INVENTION

The programmable, automatic compact disk duplication system of this invention includes a copy unit, a host computer, and computer software. The host computer and computer software provide an interface allowing the user to pre-program the copy unit to perform a completely unattended copy and data verification operation upon blank CD-R disks pre-loaded in the copy unit.

While not required for operation of the duplication system, it is preferred that the duplication system use an IBM PC-clone running a DOS or Windows operating system so that users need not purchase additional computer hardware to operate the duplication system. Hardware-specific computer components necessary to describe the duplication system will reference IBM PC and Windows specifications; however the duplication system is not intended to remain limited to these specifications and a designer skilled in the art would be able to translate these specifications into hardware and software equivalents for systems using Apple, UNIX, or IBM protocols.

The Copy Unit

The copy unit has a main copy assembly with an external vacuum pump. The primary components inside a housing for the main copy assembly include a microprocessor, a set of disk spindle members, a pivotal transport tower, a data transfer unit, a vacuum regulator and an air filtration unit. The external vacuum pump is connected to the vacuum regulator by an air hose leading to a disk suction pickup unit affixed to the pivotal transport tower.

1. The Microprocessor

The microprocessor is an internal control unit for the copy unit and is electrically connected to the host computer, the pivotal transport tower, and all CD-R disk drive heads. In the preferred embodiment, a 8031 microprocessor is used, but any 8-bit microprocessor capable of processing a command set of about 20 commands could be used.

The microprocessor receives user input generated by the software that is executed on the user's host computer. The computer software processes the user input into a set of ASCII commands sent to microprocessor via an RS-232 interface. The ASCII command set used is a variant of the Trace Mountain protocol that is often used to interface software to hardware copy devices. Commands sent by the computer software to the microprocessor consist of one letter or one letter and two digits.

Once the microprocessor is sent a command by the host computer, the microprocessor parses the command and sends an electrical signal to the pivotal transport tower.

Depending on the command sent by the computer software, the microprocessor will transmit back to the computer software a "ready" indication, an echo of the command received, or a status indication that command received was successfully or unsuccessfully executed. This status indication is then interpreted by the computer software into user readable information displayed on the host computer's video output display.

2. The Disk Spindle Members

A set of disk spindle members are located on a front horizontal deck of the copy unit. The bottom of each disk spindle member is affixed to the horizontal deck of the copy unit and projects vertically from the deck. The diameter of each disk spindle member is slightly smaller than the center hole of a CD-R disk, allowing for free vertical movement of the CD-R disk when the disk is located on the disk spindle member.

The disk spindle members are affixed to the horizontal deck of the copy unit along an arc of a circle around the axis of the pivotal transport tower. It is expected that at least two disk spindle members are affixed to the horizontal deck of the copy unit, allowing one disk spindle member to hold blank CD-R disks and the other disk spindle member to hold burned CD-R disks. The radius of the circle is selected such that CD-R disks located on adjoining spindles do not touch each other.

3. The Pivotal Transport Tower

The pivotal transport tower is centrally located in the copy unit at the radial center of the arc formed by the disk spindle members. The pivotal transport tower is cylindrically shaped, with a vertically displaceable arm projecting radially from the pivotal transport tower. Inside the pivotal transport tower is an axle along the vertical axis of the pivotal transport tower. The axle is affixed to the base of the pivotal transport tower. Connected to the axle is a first drive motor capable of pivoting the pivotal transport tower about its vertical axis. Control of the first drive motor is also supplied from electrical signals sent by the microprocessor.

An arm for a disk pickup head projects radially from the pivotal transport tower. One end of the arm is connected to a belt running vertically along the inside of the pivotal transport tower. The bottom of the belt travels around a set of gears that are connected to a second drive motor. When the second drive motor rotates the belt, the arm is raised or lowered depending on the direction of rotation of the belt.

The other end of the arm supports a disk pickup head which has a disk suction pickup unit. The disk suction pickup unit is triangle-shaped and has a circular aperture located at its apex. The diameter of the aperture is slightly wider than the diameter of a disk spindle member. Located on the underside of the disk suction pickup unit near each vertice of the disk suction pickup unit is one suction member and one rubber stopper member. A sensor also protrudes downward from the underside of the disk suction pickup unit and relays an electrical signal back to the microprocessor indicating the presence of a target disk near the disk suction pickup unit.

Additionally, during operation of the disk suction pickup unit, RAM memory located in the microprocessor or electrically connected to the microprocessor retains data for each disk spindle member corresponding to the approximate vertical distance the disk suction unit must travel before retrieving a blank CD-R disk or placing a burned CD-R disk back onto the disk spindle member.

When the disk suction pickup unit is operated, the suction members draw in air, causing the target disk to adhere to the suction members, holding the target disk horizontally against the rubber stopper members.

The size and placement of the arm and the disk suction pickup unit are chosen so that during a disk pick-up or drop-down operation the selected disk spindle member passes through the aperture as the arm lowers below the top of the selected disk spindle member.

In a typical disk transport operation, the microprocessor issues a sequential set of electrical signals that are translated into a sequential set of operations performed by the second drive motor, the first drive motor, and the disk suction pickup unit. For example, the following sequential operations controlled by the microprocessor occur when the copy unit transfers the top CD-R disk from a stack of CD-R disks surrounding a selected spindle to the data transfer unit:

- the first drive motor raises the disk suction pickup unit to a height such that all components of the disk suction pickup unit are above the top of all disk spindle members;
- the second drive motor pivots the pivotal transport tower to position the disk suction pickup unit over the selected disk spindle member, placing the aperture directly above the disk spindle member;
- the first drive motor lowers the disk suction pickup unit along the disk spindle member until the suction members make contact with the CD-R disk;
- the suction members engage and hold the CD-R disk;
- the first drive motor raises the disk suction pickup unit along the disk spindle member until the CD-R disk held by the suction members is above the top of all disk spindle members;
- the second drive motor pivots the pivotal transport tower, positioning the CD-R disk held by the suction members for transfer into the data transfer unit.

4. The Data Transfer Unit

The data transfer unit comprises two stacked disk drive receptacle members and a variable number of stacked recordable disk drive members. The two stacked disk drive receptacle members are affixed on opposite sides of the back horizontal deck of the copy unit and positioned along the arc of the circle formed by the disk spindle members at a distance greater than the diameter of a CD-R disk. Each stacked recordable disk drive member fits in a slotted receptacle member located in one of the two stacked disk drive receptacle members and is positioned on the perimeter of the circle formed by the disk spindle members, making each stacked recordable disk drive member capable of receiving a disk transported by the arm.

Each stacked recordable disk drive member sends and receives binary data with the computer software via a standard 50-pin SCSI connection between the stacked recordable disk drive member and the host computer. Manual loading and unloading of a CD-R disk in every stacked recordable disk drive member is accomplished through an input-output tray member that is a standard feature of recordable and read-only disk drives; control of the input-output tray member is also communicated through each stacked recordable disk drive member's SCSI connection.

In the preferred embodiment, the top of the main copy assembly located in the void between the two stacked recordable disk drive members has a disk reject slide that is constructed at a downward angle, allowing the combination of the pivotal transport tower and the two stacked recordable disk drive members to eject defective CD-R disks out of the main copy assembly by dropping them onto the disk reject slide. Gravity pulls the defective CD-R disk downward along disk reject slide and the defective CD-R disk leaves the main copy assembly.

An additional hardware item easily added to the data transfer unit is a standard disk printer that affixes printed labels or imprints the top side of any burned CD-R disk. In this configuration, the disk printer is placed along the rear wall of the copy unit so that the input/output loading tray of the disk printer opens into the void between the two stacked recordable disk drive members.

5. The Vacuum Regulator and the External Vacuum Pump

The vacuum regulator is housed inside the main copy assembly and is connected to the suction members by a set of internal air hose members. An external air hose connects the vacuum regulator to the external vacuum pump that is physically separated from the main copy assembly in order to reduce vibrations inside the main copy assembly. The vacuum regulator maintains a constant pressure vacuum and is controlled by the microprocessor.

6. The Air Filtration Unit

The air filtration unit creates a flow of filtered air through the inside of the main copy assembly to significantly reduce CD-R disk read or write errors caused by dust or other contaminants that may be in the air surrounding the duplication system. The air filtration unit comprises a set of electric fan members, an air filter, a set of outflow vents, and an outer cover covering the outside of the main copy assembly. The electric fan members are positioned along the back vertical face of the main copy assembly and when operated draw air into the inside of the main copy assembly.

Positioned along the inside vertical face of the main copy assembly is an air filter that filters air drawn in by the electric fan members before it can circulate through the inside of the main copy assembly. The filtered air then exits the main copy assembly through the outflow vents.

The Host Computer

No particular type of host computer is necessary to support the copy unit and the computer software. A conventional personal computer equipped with a SCSI throughput interface and a hard disk drive capable of retaining an image of the master data will suffice.

The Computer Software

In the preferred embodiment, the computer software necessary to direct the data transfer operations is written in the "C" programming language running under a Windows operating system. However, the computer software could be written using any computer language and operating system compatible with the computer used, provided Trace Mountain—type protocols can be sent to the copy unit via an RS-232 or SCSI connection between the host computer and the copy unit.

These and other features will become apparent from a consideration of the Detailed Description of the Preferred Embodiments.

DETAILED DESCRIPTION OF THE PREFERRED EMBODIMENTS

Figure 1:
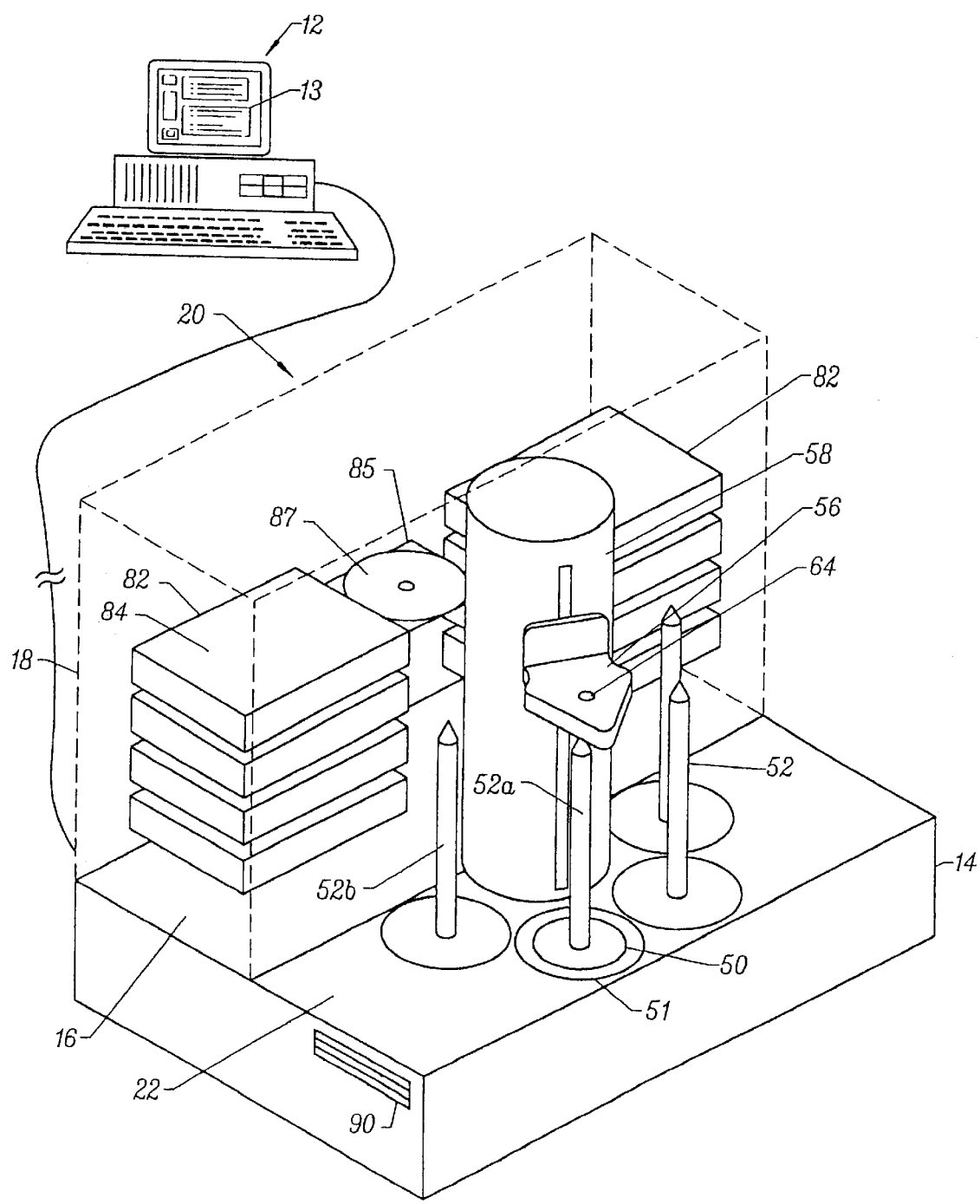
FIG. 1 is a schematic view of the compact disk duplication system this invention with a perspective view of the copy unit.

Referring to FIG. 1, the programmable automatic compact disk duplication system of this invention is designated generally by the reference numeral 10. The duplication system 10 includes a host computer 12, shown schematically, connected to a copy unit 20. The host computer 12 comprises a programmable computer that includes computer software for providing a user interface for operating the copying process of the copy unit 20. It is to be understood that the host computer may be incorporated into the copy unit 20 with the copy unit having a keyboard or other input device such as a control panel for managing the operation of the copy unit 20.

Figure 2:
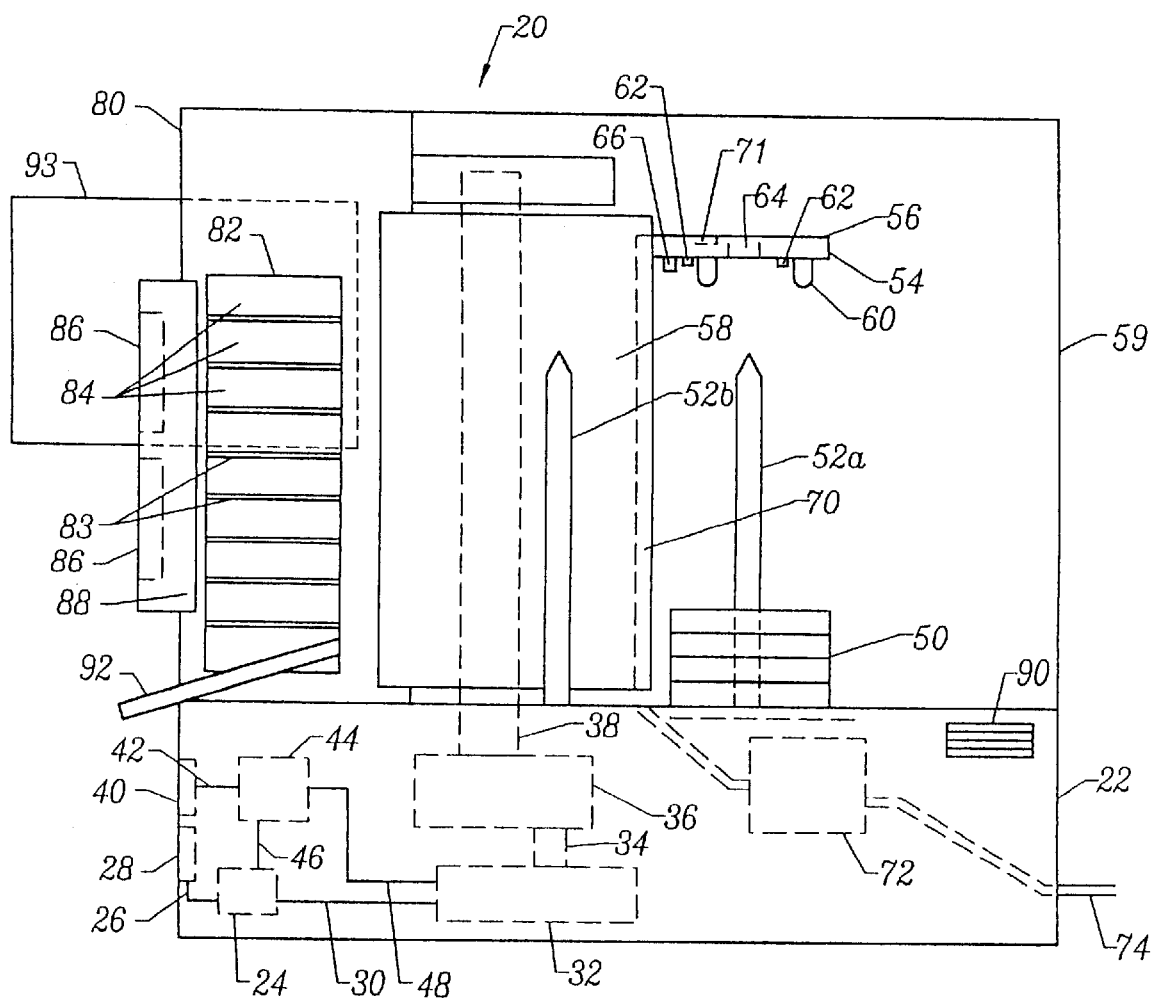
FIG. 2 is a side view of the main copy assembly with the clear outer cover removed.

As shown in FIG. 2, the copy unit 20 includes an internal microprocessor 24 that is electrically connected to the host computer 12 for controlling the electromechanical operations of the copy unit 20. The copy unit 20 is constructed with a housing 14 having a deck 16 housing the electronics and drive assemblies, and a cabinet 18 housing the copying and printing components.

The deck 16 has a base platform 22 for a pivotal transport tower 58 and a series of disk spindle members 52 disposed in an arcuate arrangement around the transport tower 58. A removable transparent cover 59, shown in FIG. 2, encloses the tower 58 and disk spindle members 52 to protect the system from dust contamination during operation and allow for functioning of an air filtration circuit as later described.

In the preferred embodiment of FIGS. 1 and 2, the copy unit 20 has four disk spindle members 52. In such a configuration two of the disk spindle members 52 may hold blank CD-R disks, one disk spindle member designated as a master disk spindle member 52a may hold one or more master compact disks. The remaining disk spindle member is designated as a master output spindle 52b and is used to hold the master compact disks after source data has been transferred from the master disk.

The pivotal transport tower 58 is located in the center of the arc formed by the disk spindle members 52 and rotates about its longitudinal axis passing directly through the center of the arc. Attached to the pivotal transport tower 58 is an arm 56 that rotates along the arc as the pivotal transport tower 58 pivots and also travels vertically along the pivotal transport tower 58. A vertical aperture 64 having its center correspond to the arc is located on the arm 56.

As described below, the underside of the arm 56 has several components allowing the arm 56 to temporarily affix a compact disk to the underside of the arm 56 and retain the compact disk as the arm 56 travels radially or vertically. Other means including mechanical pickup mechanisms may be substituted for the preferred pneumatic unit of the described embodiment.

In FIG. 2., the arm 56 is positioned above one disk spindle member that is holding a stack of CD-R disks 50. For illustration purposes this disk spindle member is designated as the master disk spindle 52*a*, but it is to be understood that the physical transfer of compact disks from all disk spindle members is identical. At the base of each disk spindle member 52 is a removable spindle base 51 allowing the user to insert or remove a stack of compact disks held in place by the disk spindle member 52.

Upon activation of a motor housed inside the copy unit 20, the arm 56 descends with the disk spindle member 52 passing through the aperture 64, until a sensor 66 located on the underside of the arm 56 detects the presence of a compact disk 50. Then suction supplied by disk suction pickup unit 54 affixes the compact disk 50 to the underside of the arm 56, the suction remaining constant until the compact disk 50 is transported to its resting place. The suction then terminates and the compact disk 50 is released from the arm 56 by gravitational force.

Located opposite the disk spindle members 52 are two sets of stacked disk drive receptacle members 82. Each stacked disk drive receptacle member 82 accepts a standard stacked recordable disk drive member 84. Each stacked recordable disk drive member 84 has an autoloading tray 85 that, when fully opened, positions the center of a compact disk 87 along the radius arc defined by the arc of the disk spindle members 52. This geometrical configuration allows the arm 56 to place and retrieve compact disks in any of the stacked recordable disk drive members in the same manner as the arm 56 places and retrieves compact disks on the disk spindle members 52.

For clarity, in FIG. 2 the components located inside the main copy assembly 20 are designated schematically by hatched rectangles, and where necessary, detailed drawings of these components are shown in other figures.

The deck 22 of the main copy assembly 20 in box-shaped, having a flat rectangular bottom and sides perpendicular to the bottom. Inside the deck 22 is a microprocessor 24 that is connected by an electrical connection 26 to an RS-232 port 28. A stepper motor 32 receives signals sent by the microprocessor 24 through an electrical connection 30. A shaft 34 leaving the stepper motor 32 connects to a gearing unit 36. Connected to the gearing unit 36 is an axle 38 that rotates when the stepper motor 32 is engaged. An external air hose 74 enters an opening in the deck 22 and terminates at a connection to a vacuum regulator 72.

A female power receptacle 40 allows for attachment of an electrical cord (not shown) providing standard 120V AC to a transformer 44 through an electrical line 42. As detailed below, the transformer 44 supplies power to components throughout the main copy assembly 20; inside the deck 22, the microprocessor 24 receives power through electrical line 46 and the stepper motor 36 receives power through electrical line 48.

Compact disks 50 sit on the top of the deck 22 and are held in place by one of the disk spindle members 52 until retained by the disk suction pickup unit 54 that is located on the underside of the arm 56. An aperture 64 through the arm 56 allows the disk suction pickup unit 54 to travel downward with the selected disk spindle member 52 passing through the aperture 64 as the disk suction pickup unit 54 travels downward below the vertical height of the top of the disk spindle member 52.

The disk suction pickup unit 54 has suction members 60 creating sufficient suction to hold one disk against the rubber stopper members 62 that keep the disk in a horizontal position. The vacuum hose 70 is positioned along the inside wall of the pivotal transport tower 58 and one end is connected to the vacuum regulator 72. The other end of the vacuum hose 70 has three connector members 71 allowing the air flow to branch into each attached suction member 60. A sensor 66 is attached to the disk suction pickup unit 54 and sends a signal back to the microprocessor indicating the presence of a disk near the disk suction pickup unit 54.

The arm 56 is affixed to the pivotal transport tower 58 and rotation of the arm 56 is accomplished through pivoting of the pivotal transport tower 58 The other end of the arm 56 is secured around the axle 38, allowing for radial movement of the pivotal transport tower 58 when the axle 38 rotates.

Behind the pivotal transport tower 58 is the data transfer unit, designated generally by the numeral 80. Sitting on each of the two rear corners of the deck 22 is a stacked disk drive receptacle member 82 containing slotted receptacles 83 for holding a variable number of stacked recordable disk drive members 84, allowing the user vary the total number of recordable disk drives available to burn disks. Each stacked disk drive receptacle member 82 can also hold a read-only disk drive permitting very fast transfer of data from master disks.

The stacked disk drive receptacle members 82 are placed on top of the deck 22 along the outside of the perimeter of the circle formed by the disk spindle members 52 such that the arm 56 may transfer a disk to the space between the two stacked disk drive receptacle members 82. A disk transported to this region may then be inserted into any of the stacked recordable disk drive members 84 provided the stacked recordable disk drive members 84 have a standard motorized loading tray 85.

Located at the bottom of the region between the stacked disk drive receptacle members 82 on the top of the deck 22 is a disk reject slide 92 slanting downward out of the rear of the data transfer unit 80 that receives defective CD-R disks dropped down by the arm 56 in the region between the stacked disk drive receptacle members 82. Defective CD-R disks dropped onto disk reject slide 92 fall out of the main copy assembly 20 by gravity.

The system can also be equipped with an optional print application unit 93 that is placed behind the stacked disk drive receptacle members and loads and unloads CD-R disks in the space between the two stacked disk drive receptacle members 52 and directly above the disk reject slide 92. In this configuration, the print application unit 93 is electrically connected to the host computer 12 and imprints markings or printed labels to the top side of a burned CD-R disk.

Figure 5A:
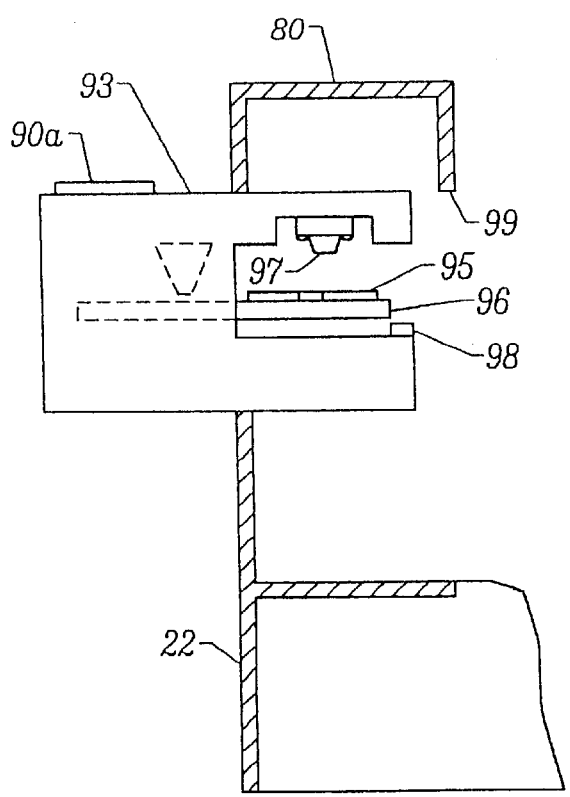
FIGS. 5A and 5B are schematic representations of an auxilliary print application unit.
Figure 5B:
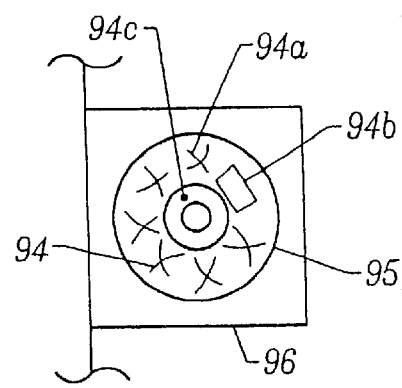

The optional print application unit 93 is shown in FIGS. 5A and 5B. The print application unit comprises an ink jet printer or a thermal printer to imprint a blank disk with markings or labels. Where disk blanks are previously printed with markings 94, such as designs 94*a*, and a label window 94*b* as shown in FIG. 5B, it is necessary to rotate the disk or rotate the virtual bit mapping of the new marking or labels to be added, so that the new printing registers with the pre-existing printing. It is common, for example, for blank CD-R disks to have company names and logo's pre-printed by a silk screening process by the disk supplier or an intermediary. New material may comprise titles or added decorative work requiring registration coordination. Since disks are symmetrical and consistently positioned, proper angular orientation is all that is required to achieve registration.

In FIG. 5B, a disk 95 is positioned on retractable printer tray 96 and is preprinted with an angular registration mark, such as dot mark 94C adjacent the hub hole. A digital camera 97 retrieves a digital image of at least the center portion of the disk, and the limited field area where the mark must necessarily be found is analyzed by a software program to locate the registration dot mark 94c and to determine its angular orientation. The virtual image in memory is rotated accordingly before or while the reoriented bit map is printed to disk.

By use of a simple registration mark positioned in a predetermined annular area, image analysis is greatly simplified and equipment costs are reduced. Furthermore, by consistent placement of the mark with respect to the angular orientation of the original printing, an initial run for image loading of the original printing is avoided.

When the print application unit is a thermal printer, the newly printed image or markings requires little or no time to cure before the disk can be robotically handled and moved to the output spindle. Ink jet printing requires a bit longer for the deposited ink to dry before handling. Ordinarily, with simple labels and text titles, the limited ink deposit dries during the time another disk is being recorded in a single station duplication system. In a multiple station system as is presently disclosed, accelerated drying is prefereed to insure proper drying.

In the duplication system of this invention, accelerated drying for ink jet printing is aided by an elongated thermal element 98 at the lower edge of the partially shrouded opening 99 of the application unit 93. Heated air passing to an external vent member 90a at the back top of the print unit 93 accelerates the drying of the ink. The system is preferably programmed to allow the disk 95 to remain in the extended tray 96 as long as possible after printing before pickup by the pickup unit 54 on the transport tower 58 and deposit on the output spindle.

Located at the rear of the stacked disk drive receptacle members 82 are one or more electric fan members 86 that draw in air to ventilate the main copy assembly 20 preventing heat build-up created by the stacked recordable disk drive members 84. An air filter 88 is positioned on the interior rear wall of the data transfer unit 80 that filters the air drawn in by the electric fan members 86 before the air travels through the interior of the main copy assembly 20. The filtered air then exits the interior of the main copy assembly 20 through vent members 90b located on the deck 22.

In systems having the optional print application unit 93, the filtered and warmed air is passed through the printer to exit the auxiliary vent member 90a as described. The circulated air aids in drying of the printed disk deposited on the top of the output spindle as well.

In a system having a mechanical pickup unit that engages the disk hole and does not contact the newly printed surface, the thermal element and programmed delay of pickup may be unnecessary, and drying accomplished by the component warmed air circulated over the printed disk when on the printer tray and on the output spindle.

Figure 3:
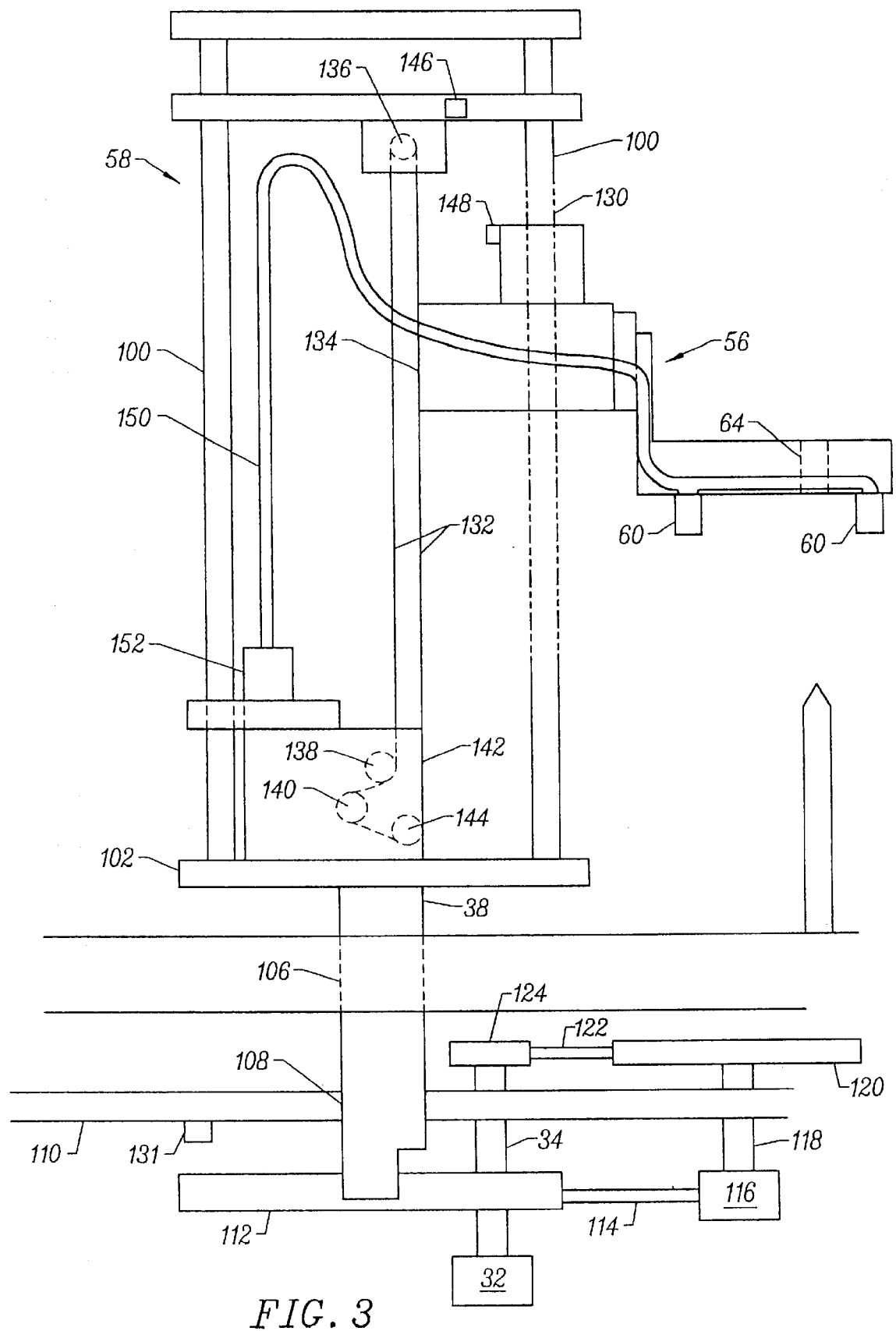
FIG. 3 is an enlarged side view of the pivotal transport tower.
Figure 4A:
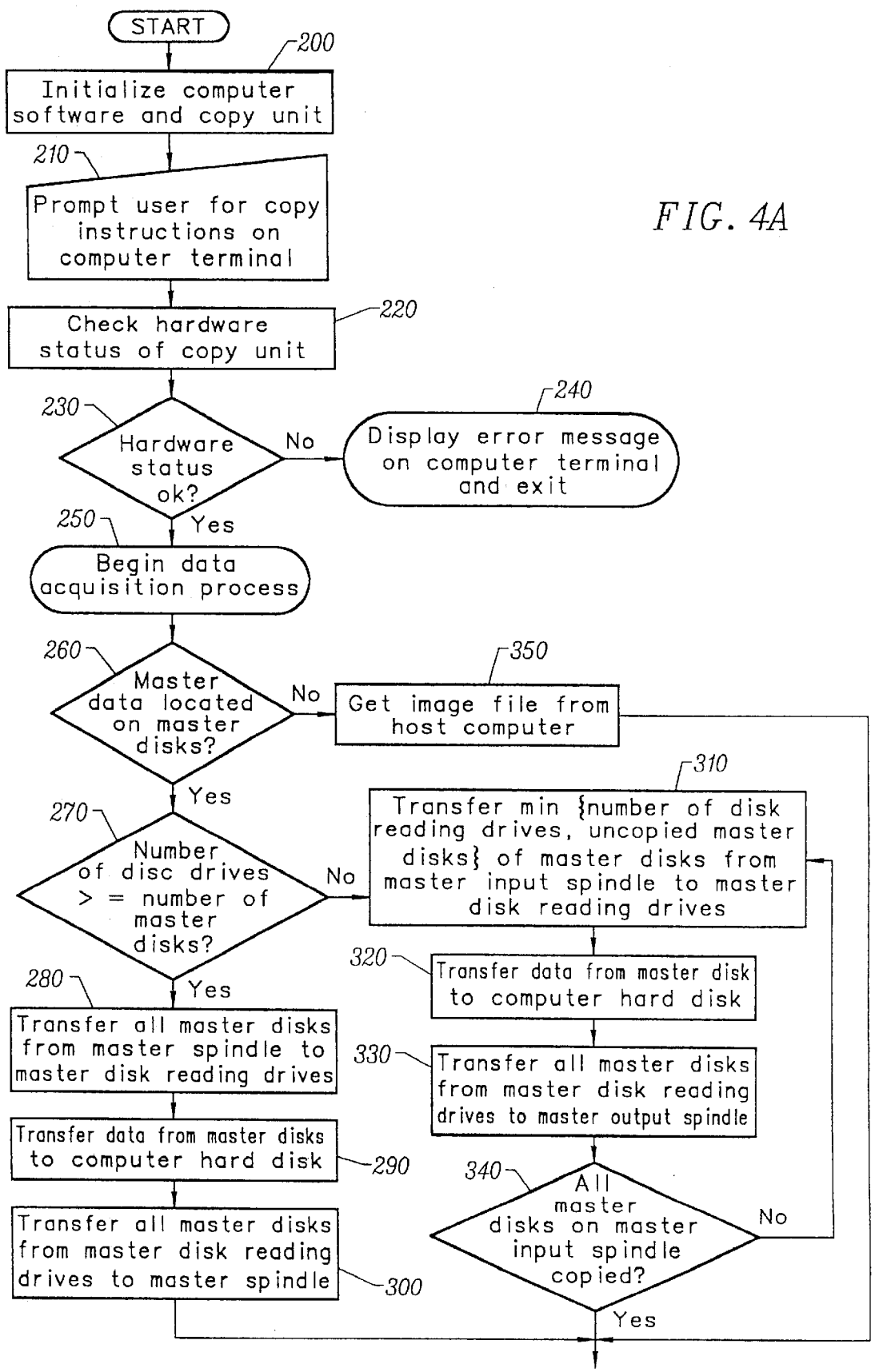
FIGS. 4A–D are segments of a continuing flowchart diagram of the procedures performed in a disk copy operation.
Figure 4B:
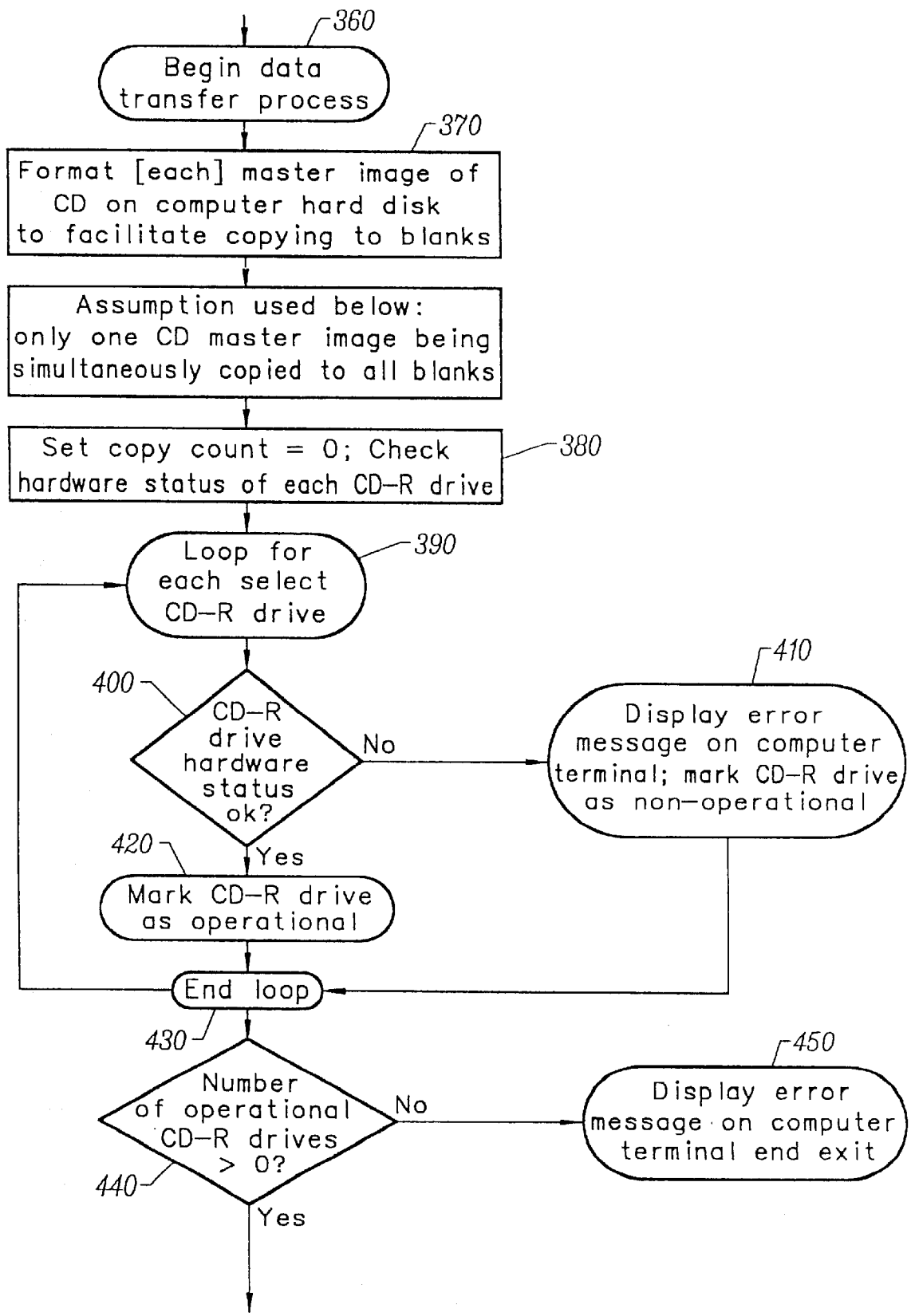
Figure 4C:
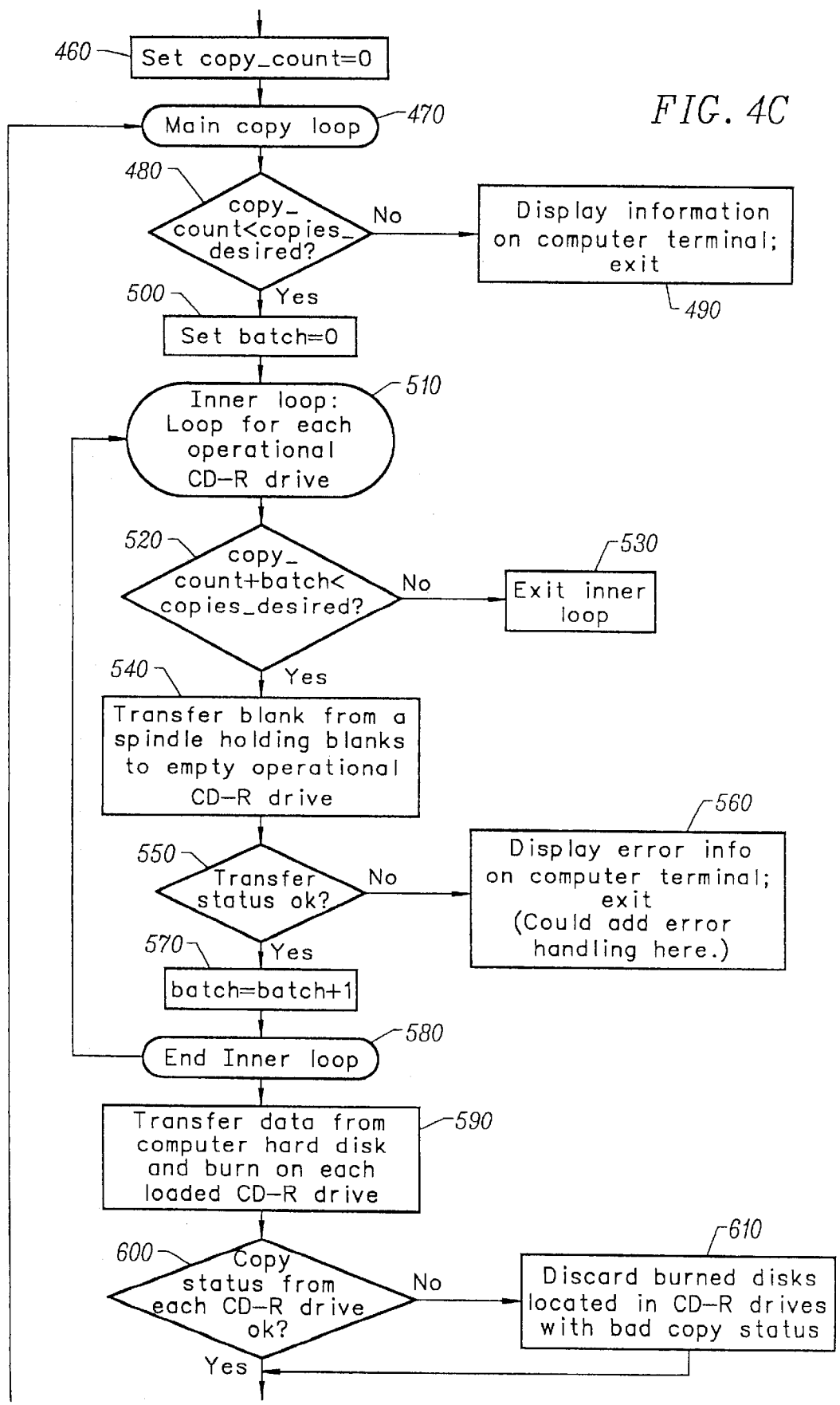
Figure 4D:
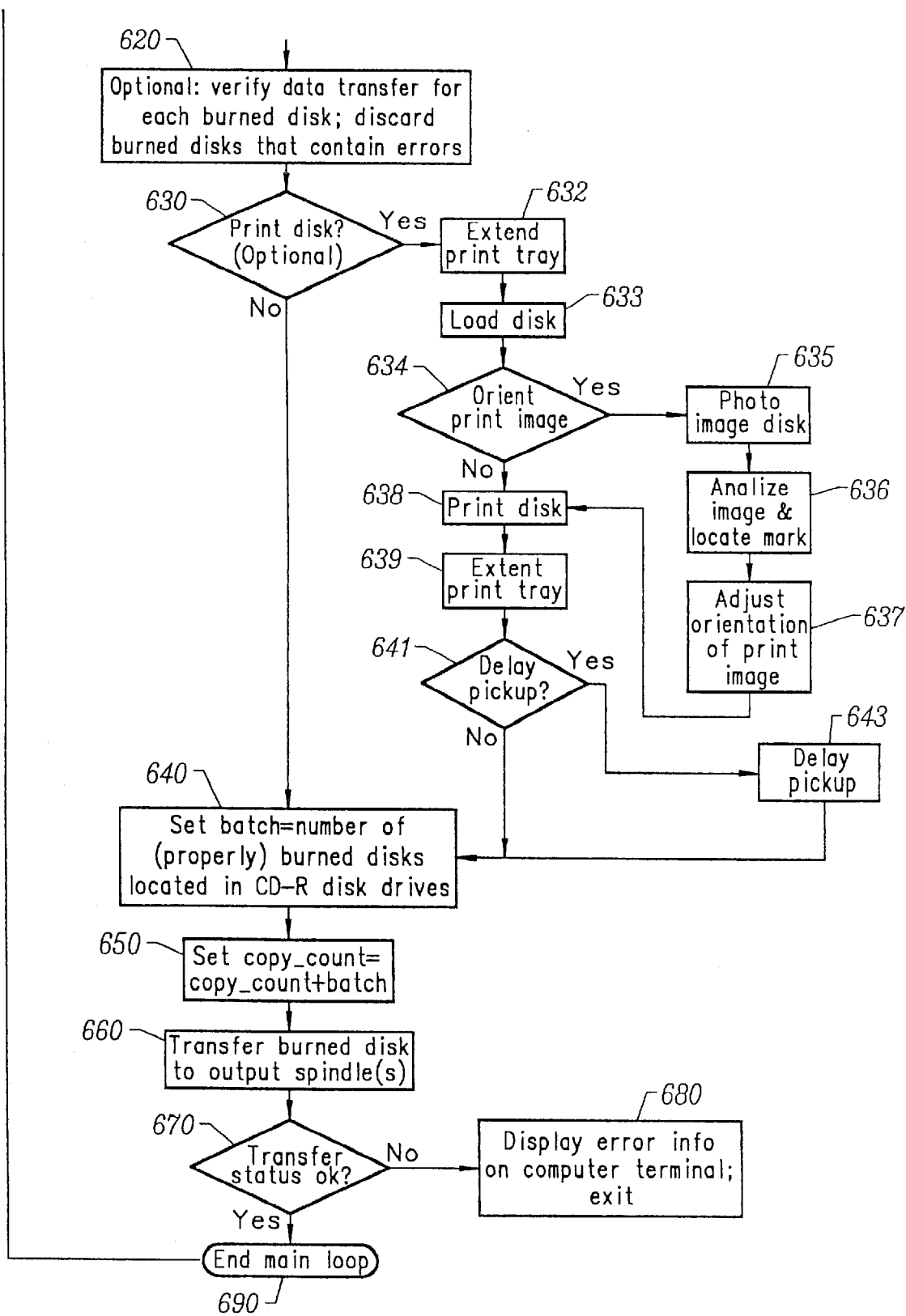

Referring to FIG. 3, a side view of the mechanical linkages that allow for movement of the pivotal transport tower is shown. The pivotal transport tower 58 has a cylindrical outer shell 100 that is oriented vertically and sits on a circular rotating base 102. Affixed to the bottom of the center of the rotating base 102 is an axle 38 that allows for radial movement of the pivotal transport tower 58.

The axle 104 passes through an aperture 106 in the top of the base platform 22 and also passes through an aperture 108 in a horizontal frame member 110. The end of the axle 38 is affixed to the center of a pulley wheel member 112. Rotation of the pulley wheel member 112 is controlled by a belt 114 surrounding a second pulley wheel member 116.

Affixed to the center of the second pulley wheel member 116 is one end of an axle 118. The other end of the axle 118 is affixed to the center of a third pulley wheel member 120. Rotation of the third pulley wheel member 120 is controlled by a belt 122 that also surrounds the perimeter of a fourth pulley wheel member 124.

Rotation of the fourth pulley wheel member 124 is controlled by one end of a shaft 34 that is affixed to the center of the fourth pulley wheel 124. The other end of the axle 34 is connected to the stepper motor 32 that is the source of all rotation of the pivotal transport tower 58. Attached to the frame 110 is an encoder sensor 131 that is electrically connected to the stepper motor 32 and prevents over-rotation of the pivotal transport tower 58.

An aperture 130 through the cylindrical outer shell 100 allows for movement of the arm 56 along the vertical axis of the pivotal transport tower 58. The back 134 of the arm 56 is affixed to a belt 132 that travels vertically and raises or lowers the arm 56 as the belt 132 moves.

The top end of the belt 132 travels around a pulley wheel member 136. The outer side of the rear face of the belt 132 makes contact with a pulley wheel member 138 that makes the rear face of the belt 132 travel towards the rear of the pivotal transport tower 58.

The inner side of the rear face of the belt 132 then travels around a pulley wheel member 140 that is connected to a stepper motor 142 that rotates the pulley wheel member 140 when the stepper motor 142 is engaged.

The inner side of the rear face of the belt 132 then travels around a pulley wheel member 144 that changes the direction of the travel of the belt 132 back to vertical.

The stepper motor 142 is electrically connected to a limit sensor 146 placed above the pulley wheel member 136 and disengages the stepper motor 142 when the limit sensor 146 detects the presence of a limit flag 148 placed on the top of the arm 56.

One end of the air line 150 is connected to a vacuum line valve 152 that controls the flow of air through the air line 150. The air line 150 travels through the inside of the pivotal transport tower 58 and through the arm 56 and the disk suction pickup unit 54, with openings connected to each disk suction member 60.

Referring to FIGS. 4A through 4D, a flowchart of the procedures performed in a disk copy operation, are shown. The logic necessary to perform a disk copy operation is programmed into the computer software on the host computer and programmed into the microprocessor located inside the copy unit.

A user begins a disk copy operation by loading master disks on a disk spindle member designated as the master disk spindle member 52a and loading blank recordable disks onto other disk spindle members 52. The user then supplies power to the copy unit 20 and starts the computer software located in the host computer 12. These initialization sub-procedures are indicated in item step 200. A display 13 connected to the host computer 12 then prompts the user for information regarding the selection of the master disk spindle 52a and the location of the blank CD-R disks. The user also selects a master output spindle 52b that will hold master disks after the data transfer from each master disk to the host computer 12. The user also supplies instructions indicating the tracks on the master disks to be copied. This operation is indicated in item step 210.

When first powered on, the internal microprocessor 24 sends electrical signals to test the operation of the arm 56, as indicated in item step 220. The microprocessor 24 sends a set of flags back to the computer software to signal the status of the hardware located on the copy unit 20, as indicated in item step 230. If the computer software receives a status flag indicating hardware failure, the computer software issues a display error message for the user to decode, and the copy process is terminated, as indicated in item step 240.

If the computer software receives status flags indicating the hardware is operational, the computer software sends instructions to the microprocessor that comprise a data acquisition subprocedure. The beginning of the data acquisition subprocedure is indicated in item step 250 and comprises item steps 260 through 340.

In item step 260, the computer software checks if a disk drive on the host computer contains an image of the master data. If an image file already exists, control of the software is transferred to item step 360. Otherwise, control of the computer software is transferred to item step 270.

As indicated in item step 270, the computer software first compares the number of disk drives to the number of master disks loaded on the master disk spindle member 53. If the number of stacked recordable disk drives 84 is greater than or equal to the number of master disks, the computer software sends a command set to the microprocessor 24 to transfer each master disk to an available stacked recordable disk drive 84, as indicated in item step 280.

The computer software then sequentially issues read commands to each stacked recordable disk drive 84 containing a master disk and transfers the source data from each master disk to the host computer 12. These commands are summarized in item step 290. Once the data transfer process is completed, the computer software sends a command set to the microprocessor to transfer each master disk back to the master output spindle 55, as indicated in item step 300, and the data acquisition subprocedure is complete.

If the number of stacked recordable disk drives 84 is less than the number of master disks, the computer software must loop through item steps 310 through 340 until all master disks have been transferred to an available stacked recordable disk drive 84.

This loop begins when the computer software sends a command set to the microprocessor 24 to transfer the maximum number of remaining uncopied master disks held by the input spindle from the master disk spindle member 52a to the stacked recordable disk drives 84, as indicated in item step 310. Then in item step 320, data is transferred from the master disks to the host computer 12 in the same manner as in item step 280.

After all data from the master disks loaded in stacked recordable disk drives 84 has been transferred to the host computer 12, the master disks are either transferred to the master output spindle 55, or are ejected onto the disk reject slide 92, as indicated in item step 330.

The computer software completes this loop as indicated in item step 340 by comparing the number of uncopied master disks with zero, and returning to the top of the loop at item step 310 if any uncopied master disks remain. Once the data acquisition subprocedure is completed, control of the computer software is transferred to the beginning of the data transfer subprocedure, indicated as item step 360.

At the beginning of the data transfer subprocedure, the computer software will, if necessary, reformat the image of the source data located on the hard drive of the host computer to ensure optimal recording speed and accuracy. This computation is indicated in item step 370. A variable containing the number of copies made is initialized to zero, as indicated in item step 380.

Item steps 390 through 430 correspond to a loop over all selected stacked recordable disk drives 84 whereby the computer software first issues commands to the microprocessor 24 to query the hardware status of each stacked recordable disk drive 84, as indicated in item step 400. The computer software will alert the user of any stacked recordable disk drive 84 that the microprocessor 24 has identified as non-operational, as indicated in step 410. Otherwise, the computer software will set a flag indicating that the queried CD-R drive is operational, as indicated in item step 420.

Once the hardware test loop is completed, the computer software branches on a test of the number of operational stacked recordable disk drives 84, as indicated in item step 440. The computer software will exit the copy process if no stacked recordable disk drives 84 are operational, as indicated in item step 450. Otherwise, the computer software initializes to zero a variable containing the number of copies made, as indicated in item step.460.

The computer software then enters a main copy loop, indicated in item step 470, that repeats until the number of copies made equals the desired number of copies. This comparison operation is made in item step 480, and the proper termination of the copy process occurs in item step 490.

If the number of copies made is less than the number of copies desired, the computer software initializes to zero a variable containing the number of copies currently loaded in the stacked recordable disk drives 84, as indicated in item step 500. The computer software then enters an inner loop comprising item steps 510 through 580, with each cycle of the inner loop corresponding to the transfer of a blank disk to an available operational stacked recordable disk drive 84.

This inner loop begins with a comparison of the number of copies desired with the sum of the copies already made plus the number of disks loaded the current batch transfer, as indicated in item step 520. If the sum of the copies already made plus current number of disks loaded into the stacked recordable disk drives 84 equals the number of copies desired, the inner loop terminates, as indicated in item step 530.

Otherwise, the computer software issues a set of commands to the microprocessor 24 to transfer a blank disk to the next available stacked recordable disk drive 84, as indicated in item step 540. The computer software then checks the status of the disk transfer, as indicated in item step 550, and will terminate or otherwise commence other error handling subprocedures if the disk transfer failed, as indicated in item step 560. Otherwise, the variable containing the number of disks loaded is incremented by one, as indicated in item step 570.

Once the inner loop terminates at item step 580, the stacked recordable disk drives 84 have been loaded with the maximum number of blank disks, the computer software sends electrical signal instructions that activate the physical transfer of source data to each blank disk loaded in the loaded stacked recordable disk drives 84, as indicated in item step 590. The computer software then examines copy status flags from each loaded stacked recordable disk drive 84, as indicated in item step 600, and issues a command set to the microprocessor 24 to discard burned CD-R disks corresponding to any bad copy status flags, as indicated in item step 610.

In item step 620, the user can optionally configure the computer software to perform a data verification on each burned disk that is currently loaded in the stacked recordable disk drives 84. In this subprocedure, the computer software would direct each stacked recordable disk drive 84 to read the data off the burned disk and compare it to the source data residing on the hard drive of the host computer 12. Defective burned CD-R disks would be ejected from the copy unit in the same manner as in item step 610.

In item step 630, the user can optionally configure the copy unit to include a print application unit that imprints or labels the top of each burned CD-R disk with information transferred from the computer software. In this subprocedure, the burned CD-R disk is ejected from its stacked recordable disk drive 84 and vertically transported by the disk suction pickup unit 54 and then loaded into the input tray 96 of the print application unit 93.

The printer has internal software to effect the printing tasks including optional analysis of a preprinted disk and orientation of a virtual print image under command of the software of the copy unit. If optional print step is affirmative the print unit is ordered to extend the print tray 96 at step 632. The copy unit loads a correctly burned disk at step 633. If the print image must be oriented to register with a preprinting of the disk at option step 634, then the photo image step 635 takes an image of the disk which is analyzed at step 636 by the software to locate the orientation mark and calculate the angular orientation of the to-be printed image for proper registration at step 637. This accomplished, or if not required, the print disk step 638 is executed. After printing, the tray is extended at step 639, and a delay pickup decision at step 641 is made. If pickup is to be delayed, for example, to allow ink jet printing ink an extended opportunity to dry, the pickup is delayed at step 643 is made. If no, or after delay the print option loop returns to the main path at step 640 where the disk is eventually transferred to the output spindle or spindles.

The variable containing the number of loaded stacked recordable disk drives is reset to equal the number of properly burned CD-R disks, as indicated in item step 640. The total number of copies made is then incremented by the number of properly burned CD-R disks, as indicated in step 650. The computer software then issues a command set to the microprocessor 24 directing the transfer of the properly burned CD-R disks to one of the designated output spindles, as indicated in step 660. The computer software receives a status signal from the microprocessor 24 indicating whether the transfer occurred properly, as indicated in item step 670, and will display an error message and exit if a disk transfer failed, as indicated in step 680. Otherwise, control of the computer software drops to the bottom of the main loop 690 and then returns to the top of the main loop at item step 470.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A system for the duplication of data onto compact disks, the system comprising:
a copy unit, comprising:
at least one set of multiple stacked recordable disk drives;
a pivotal transport tower;
a set of disk retainer members, arranged in a symmetric circular pattern around the pivotal transport tower, wherein the disk retainer members maintain the order and placement of a stack of compact disks during the copy operations, wherein a disk stack in any of the disk retainer members in the set has a top with a top disk;
an arm, connected to the pivotal transport tower, the arm having a disk engagement and lift mechanism that cooperates with the pivotal transport tower to engage, lift and pivot a top disk located on the top of a stack held in place by one disk retainer member to any stacked recordable disk drive member, wherein the disk engagement and lift mechanism and pivotal transport tower also cooperate to engage, lift and pivot a disk located in any one of the stacked recordable disk drives to the top of any stack held in place by one of the disk retainer members.

2. The system of claim 1, wherein the number of multiple stacked recordable disk drives may be increased by the user.

3. The system of claim 1 having multiple sets of multiple stacked recordable disk drives.

4. The system of claim 1, wherein selected disk retainer members in the set of disk retainer members are removable from the copy unit.

5. The system of claim 1, wherein the copy unit has an air filtration unit, the air filtration unit comprising:
a set of electric fan members, the electric fan members drawing air into the inside of the copy unit;
an air filter, the air filter positioned along the inside vertical face of the copy unit and filtering the air drawn into the copy unit by the electric fan members;
a set of outflow vents located on the copy unit, the outflow vents allowing air drawn through the copy unit by the electric fan members to exit the copy unit.

6. The system of claim 1, including a host computer and a display wherein the host computer contains computer software and computer memory, and wherein the host computer is electronically connected to the copy unit, with the computer software providing a user interface that outputs diagnostic messages regrading the copy unit to the display.

7. The system of claim 1 wherein the copy unit includes a microprocessor located inside the copy unit wherein the microprocessor controls movement of the pivotal transport tower and the arm.

8. The system of claim 7, including a host computer and a display wherein the microprocessor is electronically connected to the host computer with the microprocessor sending electrical signals to the host computer and the microprocessor receiving electrical signal commands from the host computer, and wherein the computer software provides a user interface for user control of the copy unit.

9. The system of claim 8, wherein data to be duplicated onto compact disks is located on one or more master compact disks and is transferred to the memory of the host computer by at least one stacked recordable disk drive.

10. The system of claim 9, wherein the computer software provides a user interface for user input of copy instructions for the control of each master compact disk during the duplication of the data.

11. The system of claim 1, wherein the copy unit has a disk reject area wherein defective compact disks are transported to the disk reject area.

12. The system of claim 1, wherein the copy unit includes a label printer, wherein each compact disk has a recordable side and a printable side, wherein the pivotal transport tower and disk engagement and lift mechanism of the arm connected to the pivotal transport tower cooperate to selectively engage, lift and pivot compact disks to the printer, wherein the printer prints a label on the printable side of the compact disk.

13. The system of claim 1, wherein the system has at least one master compact disk with master data and master disk data transfer means for reading the master data on the master compact disk and then selectively transferring the master data onto the compact disks.

14. The system of claim 1, wherein the system has user interface means for pre-programming the control of the duplication of data.

15. The system of claim 1, wherein the system has defective compact disk detection means for detecting defective compact disks and ejection means for ejecting detected defective compact disks from the copy unit.

16. The system of claim 1, wherein the copy unit has a print application unit with printing means for printing on the compact disks when the pivotal transport tower and disk engagement and lift mechanism of the arm connected to the pivotal transport tower deliver compact disks to the print application unit.

17. The system of claim 16, wherein the print application unit includes means for drying a printed disk.

18. The system of claim 16, wherein the copy unit has means for circulating air, and wherein the print application unit has vent means located to optimize drying of a printed disk in the print application unit by air circulating means of the copy unit.

19. The system of claim 17, wherein the drying means includes a thermal element.

20. The system of claim 16, wherein the compact disks are preprinted and include a preprinted orientation mark, and wherein the print application unit includes means for detecting the preprinted orientation mark, computer program means for determining the angular location of the orientation mark, and computer program means for rotationally orienting a to-be-printed image in registration with the preprinted orientation mark.

* * * * *

(12) EX PARTE REEXAMINATION CERTIFICATE (7962nd)
United States Patent
Miller

(10) Number: US 6,532,198 C1
(45) Certificate Issued: *Jan. 4, 2011

(54) PROGRAMMABLE SELF-OPERATING COMPACT DISK DUPLICATION SYSTEM

(75) Inventor: David Miller, Orinda, CA (US)

(73) Assignee: Wordtech Systems, Inc., Concord, CA (US)

Reexamination Request:
No. 90/010,771, Jan. 8, 2010

Reexamination Certificate for:
Patent No.: 6,532,198
Issued: Mar. 11, 2003
Appl. No.: 09/696,376
Filed: Oct. 25, 2000

(*) Notice: This patent is subject to a terminal disclaimer.

Related U.S. Application Data

(60) Division of application No. 09/152,815, filed on Sep. 14, 1998, now Pat. No. 6,141,298, which is a continuation-in-part of application No. 08/816,257, filed on Mar. 13, 1997, now abandoned.

(51) Int. Cl.
*G11B 17/22* (2006.01)
*G11B 17/00* (2006.01)
*G11B 17/08* (2006.01)

(52) U.S. Cl. .................. 369/30.43; G9B/14.041; G9B/17.051; G9B/17.056

(58) Field of Classification Search .................. None
See application file for complete search history.

(56) References Cited

U.S. PATENT DOCUMENTS 5,914,918 A 6/1999 Lee et al.

FOREIGN PATENT DOCUMENTS

JP 04-283468 10/1992

OTHER PUBLICATIONS

"ALW–501P CD Auto Recorder User's Manual" published Jan. 1996 by Nistec Corporation, Japan.
"ALW–501T CD Auto Recorder Service Manual" published circa 1996 by Nistec Corporation, Japan.
"Pioneer DRM–5004X CD–ROM Jukebox User's Guide" published Feb. 1995 by Pioneer New Media Technologies, Inc., US.
"Pioneer DRM–5004X Service Manual" published Jul. 1994 by Pioneer Electronic Corporation, Japan.
"Kodak Disc Transporter" published Nov. 1993 by Eastman Kodak Company, US.

*Primary Examiner*—Christina Y Leung

(57) ABSTRACT

A system for the duplication of binary data onto CD-R disks, the system including a copy unit, a host computer and computer software, the software being installed in the host computer to provide a user interface and to direct the transfer of data from the host computer to the copy unit, the copy unit including a set of multiple stacked recordable disk drives, a microprocessor electronically connected to the activating mechanism of a pivotal transport tower and to the set of multiple stacked recordable disk drives. A robotic disk pickup head on the pivotal transport tower is encompassed by a set of disk spindle members arranged in a symmetric semi-circular pattern around the central tower, the disk pickup head being connected to the pivotal transport tower with an elevator mechanism for lifting and transporting compact disks among the disk spindle members and any selected one of the stacked recordable disk drive members. The microprocessor concurrently directs the movement of the disk pickup head and the copying of data to the CD-R disks in the disk drive members. After a disk copy operation is completed, the computer software and microprocessor may direct the stacked recordable disk drive members to inspect the burned CD-R disks for copy errors and further direct the disk pickup head to remove and eject defective burned CD-R disks and place properly burned CD-R disks on a specified disk spindle member. The system allows for source data to be read from multiple master compact disks inserted in specified stacked recordable disk drive members to provide for random access copying from the multiple master compact disks.

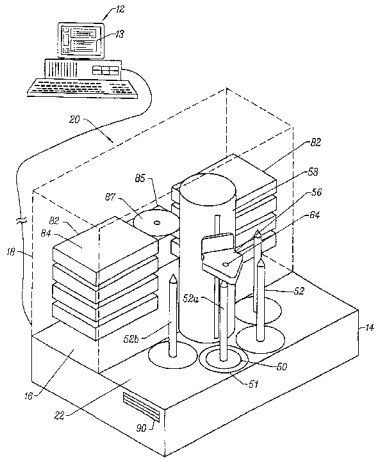

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4, 6-16 and 20 is confirmed.

Claims 5 and 17-19 were not reexamined.

\* \* \* \* \*